United States Patent [19]
Vergobbi

[11] 3,822,032
[45] July 2, 1974

[54] APPARATUS FOR FILLING CONTAINERS INCLUDING MEANS RESPONSIVE TO BOTH THE WEIGHT AND THE HEIGHT OF THE MATERIAL DISPENSED

[75] Inventor: Robert W. Vergobbi, Braintree, Mass.

[73] Assignee: Pneumatic Scale Corporation, Quincy, Mass.

[22] Filed: Mar. 1, 1973

[21] Appl. No.: 337,115

[52] U.S. Cl............................. 222/55, 141/83, 222/185
[51] Int. Cl............................................. B67d 5/08
[58] Field of Search.......... 222/55, 56, 185; 141/83, 141/95; 177/120, DIG. 6

[56] References Cited
UNITED STATES PATENTS
2,381,505   8/1945   Lindholm............................ 222/56
2,610,726   9/1952   Howard .............................. 222/55 X
3,334,675   8/1967   Satake ................................ 222/56 X

*Primary Examiner*—Stanley H. Tollberg
*Assistant Examiner*—James M. Slattery
*Attorney, Agent, or Firm*—Dike, Bronstein, Roberts & Cushman

[57] ABSTRACT

A filling machine provided with a weighing hopper for receiving a predetermined weight of material and depositing it into a container, for example a carton, in which the material is to be retailed, a feed hopper, a shutter arranged to control delivery of material from the feed hopper to the weighing hopper and controls responsive, respectively, to the weight of the material and the volume of the material deposited in the weighing hopper so that if, when a predetermined weight of material is deposited in the weighing hopper, the volume is less than a predetermined minimum the material will continue to be delivered to the weighing hopper until said predetermined minimum volume is deposited.

6 Claims, 5 Drawing Figures

APPARATUS FOR FILLING CONTAINERS INCLUDING MEANS RESPONSIVE TO BOTH THE WEIGHT AND THE HEIGHT OF THE MATERIAL DISPENSED

BACKGROUND OF THE INVENTION

Filling apparatus controlled by deposit of a predetermined weight of material to terminate the filling operation is well known in the art. However such apparatus has the drawback that, at times, even though the required weight of material has been deposited the volume will be less than normal so that a customer purchasing the packaged material will feel that he is being cheated. The reason for the difference in volume for the same weight of material from one package to another is that the density of the material will vary due both to the processing of the material and to handling. Thus if a flaked material such as corn flakes is improperly handled or processed the flakes may become broken and hence occupy a smaller volume for a given weight or if the puffed size of puffed rice is smaller than usual it will occupy a smaller volume for a given weight. The purpose of this invention is to provide a filling apparatus which would take into account the failure of the deposited weight of material to reach a predetermined volume and to continue to fill the container until the desired volume is present in spite of the fact that there may be a greater weight of material present.

SUMMARY

The invention as herein illustrated comprises in a filling machine a weighing hopper, means for delivery material to the weighing hopper, closure means movable into and out of blocking position between said first means and the weighing hopper to control the flow of material to the weighing hopper, and means for effecting movement of said last means into and out of blocking position such that if, when a predetermined weight of material has been delivered into the weighing hopper, the volume is less than a predetermined volume the closure means will remain out of blocking position until the volume reaches said predetermined volume. The means for effecting movement of the closure means from open to closed positions and vice versa comprises spring means normally urging the closure means to the closed position and cam operated linkage for moving the closure means to its open position. Latch means at the open position of the closure provides for holding the closure means in its open position and there is control means responsive to the weight of the material in the weighing hopper and the volume therein operable to disengage the latch means to permit the closure to be moved by the spring to its closed position. The control means comprises two parts, each of which holds the latch in its engaged position which are successively operable to disengage the latch, the one by deposit of a predetermined weight of material in the weighing hopper and the other by deposit of a predetermined volume of material in the weighing hopper. Switch means effects operation of the one means, the latter being actuated by displacement of the weighing hopper by deposit of a predetermined weight of material therein and sensing means effects operation of the other means in response to rise of the level of the material in the weighing hopper to a predetermined height. The weighing element of a weighing machine supports the weighing hopper and the aforesaid switch is actuated by balancing of the weighing element. A trap door is pivotally supported at the lower end of the weighing hopper for dumping the material from the weighing hopper into a carton. The trap door is held closed by a spring and there is linkage connected thereto for opening the trap door while the shutter is closed.

The invention will now be described in greater detail with reference to the accompanying drawings wherein.

Figure 1:
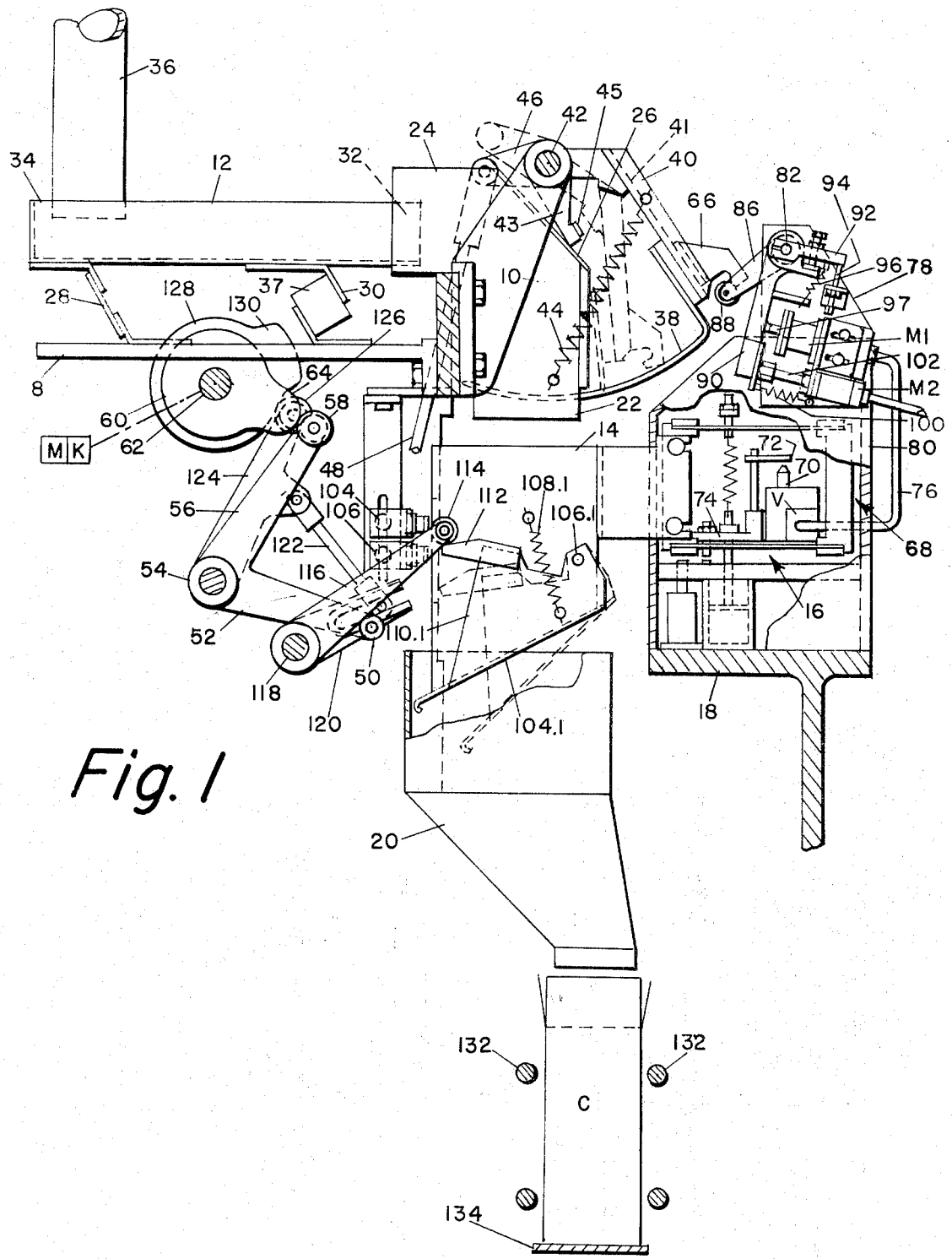
FIG. 1 is a side elevation of the filling machine of this invention.
Figure 2:
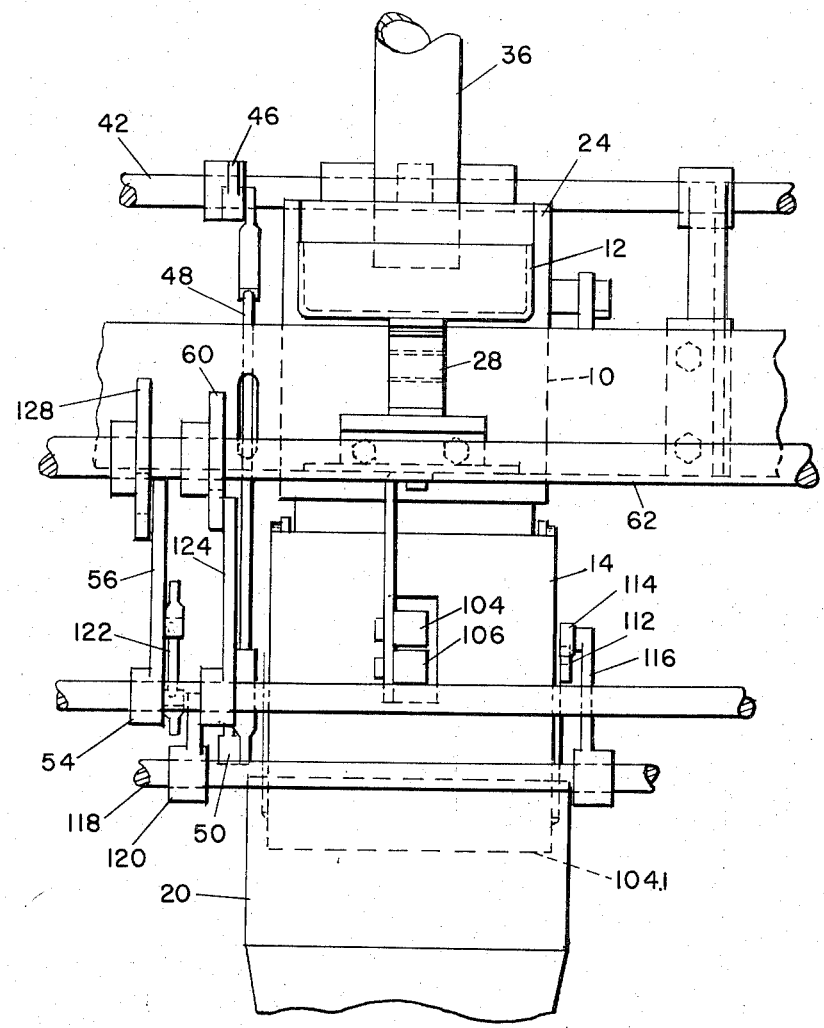
FIG. 2 is an elevation as seen from the left side of FIG. 1.

Referring to the drawings there is shown a feed hopper 10, a feeder 12 above the feed hopper for supplying material to the feed hopper, a weighing hopper 14 supported on the weighing element 16 of a weighing machine 18 below the feed hopper for receiving material from the feed hopper and a discharge conductor 20 below the weighing hopper for delivering the deposited material to a carton C below it, — all supported by a frame 8, only a part of which is shown herein.

The feed hopper 10 has right-angularly disposed, vertical and horizontal portions 22 and 24 which are in communication with each other at their intersection and open at their ends. There is a flat cover 26 arranged diagonally at the outer side of the intersecting portions which is normally closed but which provides for access to the interior when necessary. The feeder 12 is in the form of a trough supported by bracket members 28 and 30 on the frame with one end 32 disposed in the open end of the horizontal portion 24 of the feed hopper and its other end 34 in communication with the lower end of a vertical supply pipe 36. The bracket 30 embodies a vibrator 37 which initiates flow of material along the trough of the feeder into the feed hopper 10. A shutter 38 is provided for closing the open lower end of the vertical portion 22 and is supported for movement from a position covering the opening to a retracted position and vice versa by a pair of spaced arms 40—40 to which the shutter is fastened, for example, by bolts. The arms 40—40 are pivotally supported on a horizontally disposed shaft 42 and a spring 44 connected at one end to one of the arms and at its other end to the portion 22 of the feed hopper urges the shutter in a clockwise direction, as shown in FIG. 1, to a closed position. The arms are connected by a web 41 and a lever 43 is fixed to the shaft 42 intermediate the arms with an end 45 arranged by movement into engagement with the web to swing the arms in a counterclockwise direction on the shaft 42. It is to be observed that the shutter is of arcuate shape and swings about an axis located above the top of the feed hopper across the open lower end between the side walls and in engagement with the lower edges of the front and back walls.

Figure 3:
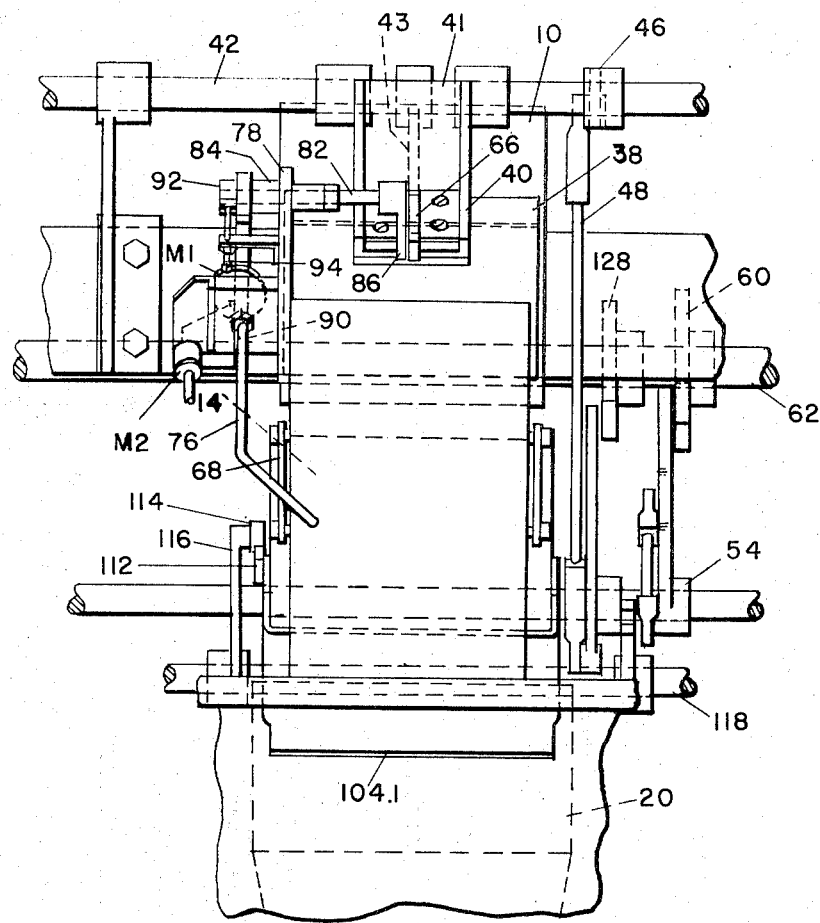
FIG. 3 is an elevation as seen from the right side of FIG. 1.

An arm 46 (FIG. 3) is fixed at one end to the shaft 42 and its opposite end is connected to one end of a rod 48. The opposite end of the rod 48 is pivotally connected to one end 50 of one arm 52 of a bell-crank lever 54. The other arm 56 of the bell crank lever 54 has at its distal end a roller 58. The roller 58 is supported by the arm 56 against a cam 60 fixed to a cam shaft 62. The cam has a projection 64 on it which, by engagement with the roller 58, will rotate the bell crank 54 in a clockwise direction and by so rotating it pull the rod 48 downwardly so as to rock the lever 43 in a counterclockwise direction. Counterclockwise movement of the lever 43 swings the arms 40—40 correspondingly to withdraw the shutter from the lower end of the feed hopper. A latch hook 66 is mounted on the web 41 between the arms 40—40 and is provided for holding the shutter in an open position during the filling of the weighing hopper with the required amount of material. Following latching the cam retracts the lever 43.

The weighing hopper 14 is of rectangular cross-section and somewhat larger than the lower end of the feed hopper and is located close enough to the lower end so that there is no chance for material to escape laterally as it falls into the upper end of the weighing hopper. The weighing element 16 to which the weighing hopper 14 is attached is part of the weighing mechanism 68 of the pneumatic weighing machine shown in U.S. Pat. No. 2,704,197. In that weighing machine there is a jet 70 (FIG. 1) supported adjacent a cap member 72, the latter being supported by an arm 74 of the weighing element 16. Downward displacement of the arm 74 will move the cap 72 into proximity with the jet 70 and thereby actuate a valve V to cut off flow of air pressure through a conductor 76 to a fluid motor M1, mounted to a bracket plate 78 which in turn is fastened to the housing 80 of the weighing machine. A spindle shaft 82 (FIG. 3) is mounted for rotation in a bearing block 84 secured to the bracket plate 78 with one end projecting inwardly therefrom (to the right) and the other end projecting outwardly therefrom (to the left). At the inner end of the spindle shaft there is mounted an arm 86 which extends radially therefrom. At the distal end of the arm 86 there is a roller 88 (FIG. 1) adapted to engage within the latch hook 66. At the outer end of the spindle shaft 82 there is an arm 90 which extends radially from the shaft and downwardly in confronting relation to the motor M1. A limit arm 92 fixed to the spindle shaft and held engaged with an adjustable stop 94 by a spring 96 limits rotation of the spindle shaft in a clockwise direction. The motor M1 has a plunger 97 held in an extended position therefrom by air pressure supplied thereto by the valve V. When extended the plunger 97 is engaged with the arm 90, the latter being yieldably supported against the plunger by a spring 100. As long as the plunger 97 is held extended it will hold the roller 88 engaged with the latch 66 and consequently hold the shutter in its open position. When the weighing element 16 is depressed by the presence of a predetermined weight of material in the weighing hopper it will bring about an actuation of the valve V, as related above, to cut off the flow of air pressure to the motor M1 whereupon the plunger 97 will permit the arm 90 to be moved in a counterclockwise direction by the spring 100 and thus release the latch hook 66. The spring 44 will then move the shutter to its closed position.

Figure 4:
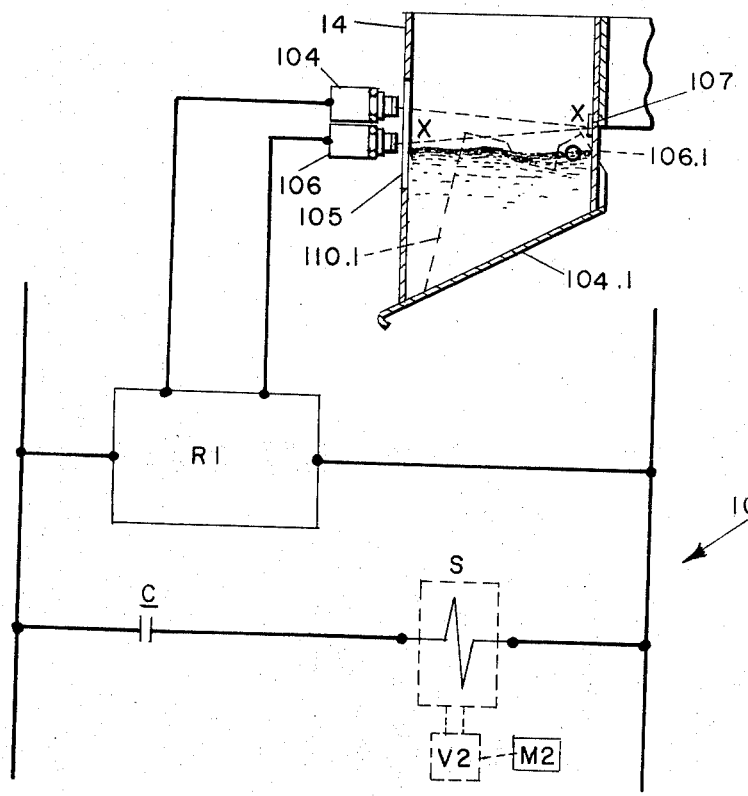
FIG. 4 is a circuit diagram showing photoelectric sensing means of the reflective type.
Figure 5:
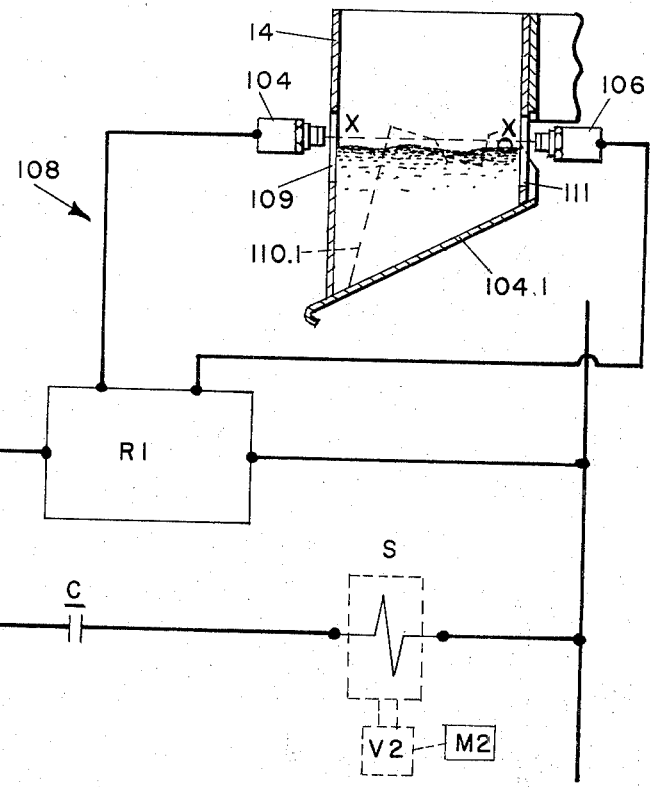
FIG. 5 is a circuit diagram showing photoelectric sensing means of the direct type.

As has been previously related, the density of the materials being weighed for delivery into cartons for sale may vary from batch to batch sufficiently to make an appreciable difference in the volume and it is the purpose of this invention to rectify this condition by continuing to supply the material to the weighing receptacle after an amount corresponding in weight to that specified has been deposited until the volume of the material in the weighing receptacle reaches a predetermined acceptable level. To accomplish this there is mounted on the bracket plate 78 below the motor M1 a second motor M2 which is provided with a plunger 102 which is internally spring loaded toward a retracted position. The motor M2 is air-operated to extend the plunger 102. Operation of the motor M2 is effected by photoelectric means comprising a cell 104 and lamp 106, respectively, of the reflective or direct type. In FIG. 4 the components 104, 106 are mounted at one side adjacent a window 105 and the beam from the lamp 106 passes through the window across the hopper along a line X—X corresponding to the absolute minimum acceptable level of material in the hopper to a reflector 107 and is reflected back across the hopper through the window to the cell 104. In FIG. 5 the cell 104 is mounted at one side adjacent a window 109 and the lamp 106 is mounted at the opposite side adjacent a window 111 so that the beam passes from the lamp along a line X—X corresponding to the absolute minimum acceptable level of material in the hopper across the hopper to the cell. The photoelectric means is connected into a control circuit 108 (FIGS. 4 and 5) which, in turn, through a solenoid-operated valve V2 controls the supply of air to the motor M2. The two motors M1 and M2 thus in conjunction, by engagement with the arm 90, hold the roller 88 engaged with the latch hook 66. When the correct weight of material has been deposited in the weighing hopper the pressure supplied to the motor M1 will be cut off as related above so that the plunger 97 will not hold the arm in latching position. However, if the volume is less than the acceptable volume the plunger 102 will remain extended in engagement with the arm 90, holding it in its extended position so that the shutter will remain open. When the acceptable volume is reached pressure supplied to the motor M2 will be cut off and the plunger 102 will be retracted thus allowing the arm to swing in a counterclockwise direction to release the shutter.

The weighing hopper 14 is closed at its lower end by a trap door 104.1 pivotally supported at 106.1 and held in a closed position by a spring 108.1. The trap door has spaced parallel side walls 110.1—110.1 which extend upwardly on opposite sides of the weighing hopper and one of these has on it a lug 112 by means of which the trap door may be swung downwardly away from the lower end of the weighing hopper to dump the content of the weighing hopper into the discharge conductor 20. Depression of the lug 112 is effected by a roller 114 at one end of an arm 116, the other end of which is fastened to a shaft 118. The shaft 118 has on it a forked arm 120 which is connected by a link 122 to an arm 124, the latter having at its distal end a roller 126 which engages a cam 128 fast to the cam shaft 62. The cam 128 has on it a projection 130 which, by engagement with the roller 126, will rock the forked arm 120 in a clockwise direction and this in turn rocks the arm 116 in a clockwise direction to depress the lug 112.

The discharge conductor 20 discharges the material directly into the upper end of the carton C which is supported in an upright position below the lower end of the discharge hopper between guide rails 132—132 in such a way that successive cartons may be moved to a position below the discharge hopper for receiving a filling of the material, for example, by means of a conveyor 134.

The photoelectric circuit by means of which the air valve V2 is actuated to supply air to the motor M2, comprises, as diagrammatically illustrated in FIGS. 4 and 5, a relay R1 which is energized when the light passes uninterruptedly between the components 104, 106 of the photoelectric means and de-energizes when the light is obstructed by the presence of material between the components 104, 106; a solenoid S which operates the valve V2; and contacts c which are in series therewith. Energizing the solenoid actuates the valve V2 to supply pressure to the motor M2.

The apparatus as thus described is designed to operate cyclically to fill containers successively delivered thereto, the operation being initiated with the shutter 38 open following return of the weighing mechanism to its unbalanced position after the content of the weighing hopper has been dumped into the carton. The material continues to be delivered to the weighing hopper until the weighing element is depressed by the correct weight of material and thereafter if the weight does not correspond to the required volume until the required volume is present whereupon the shutter is closed and the trap door opened. Opening the trap door relieves the mechanism of the weight so that it returns to its unbalanced condition. The cam shaft 62 is driven by a suitable motor and clutch diagrammatically illustrated at MK and the weighing operation is initiated by rotation of the cam shaft to a position to bring the projection 64 into engagement with the cam 56 of the bell crank lever 54 which through the rod 48 moves the shutter 38 to an open position where it is latched. The filling cycle continues with delivery of material to the weighing hopper and when both the weight and volume requirements are satisfied the shutter is closed and continued rotation of the cam shaft brings the projection 130 into engagement with the arm 124, rocking the latter in a clockwise direction to in turn depress the trap door.

It should be understood that the present disclosure is for the purpose of illustration only and that this invention includes all modifications and equivalents which fall within the scope of the appended claims.

I claim:

1. In a filling machine, a weighing hopper, means for supplying material in a free-flowing stream to the weighing hopper, a closure movable from a blocking position to an open position to control the flow of material to the weighing hopper, a spring urging the closure to a closed position, power driven means for moving the closure to an open position, latch means, a pair of plungers arranged to hold the latch means engaged with the closure as the material is fed into the weighing hopper, means responsive to a predetermined weight of material in the weighing hopper to disable one of the plungers, and means responsive to a predetermined volume in the weighing hopper to disable the other of said plungers.

2. Apparatus according to claim 1, wherein said plungers are pneumatically operable pistons.

3. In a filling machine a weighing hopper, means for supplying material in a free flowing stream to said weighing hopper, a closure, arranged to be moved to a position to prevent flow of material into the weighing hopper, two power operable means, each of which is arranged to withhold the closure from movement to said position, two switches, one for each respective power operable means, operation of the switches in conjunction disabling the power operable means, means supporting one of the switches in a position to be activated by displacement of the weighing hopper a predetermined amount, a detector mounted on the hopper for detecting the level of material therein, said second switch being activated by the detector when the level of the material reaches a predetermined height and yieldable means urging the closure to said position to prevent flow of material into the weighing hopper.

4. In a filling machine a weighing hopper means for supplying material in a free flowing stream to the weighing hopper, a closure supported for movement to a position to prevent the flow of material into the weighing hopper, power operable means arranged to withhold the closure from movement to said position, first and second switch means operable in conjunction to disable said power operable means and spring means connected to the closure operable to move the closure to said position when the power operable means is disabled, means supporting the first switch means in a position to be actuated by displacement of the hopper in response to a predetermined weight of the material and a detector connected to the second switch means operable when detecting a predetermined level within the hopper to actuate said second switch means.

5. In a filling machine a weighing hopper, means for delivering material in a free flowing stream to said weighing hopper, a closure supported for movement from a retracted position to a position to prevent flow of material into the weighing hopper, holding means operable to hold the closure in said retracted position and means operable in conjunction to disable said holding means, said last means comprising a first switch positioned to be actuated by displacement of the weighing hopper in response to a predetermined weight of material to partially disable the holding means, a detector positioned to detect the height of material in the weighing hopper and a second switch connected to and actuated by the detector in response to a predetermined height of material to completely disable the holding means.

6. Apparatus according to the claim 5 wherein the weighing hopper is open at the top, the means for supplying material to the weighing hopper has a discharge opening located at the open top of the weighing hopper and the closure is moveable across the discharge opening and there is a trap door at the bottom of the weighing hopper, operable following movement of the closure to said position across the discharge opening to discharge the material from the weighing hopper.

* * * * *